W. J. & J. H. YANCEY.
HOSE COUPLING.
APPLICATION FILED JAN. 4, 1910.
994,230.
Patented June 6, 1911.
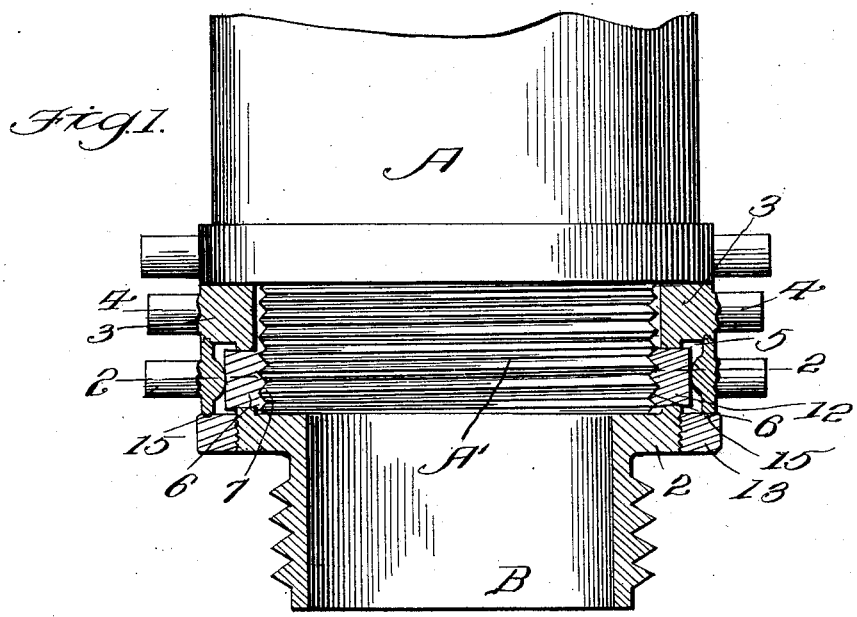
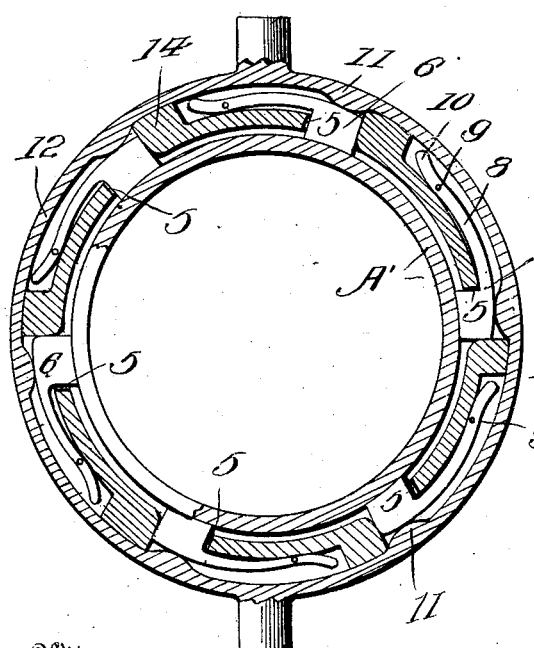
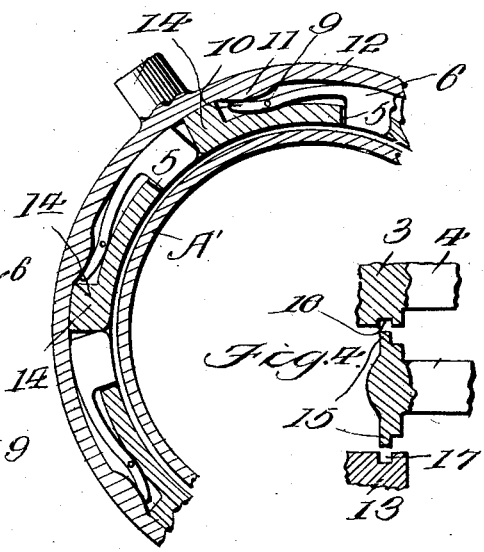
Inventors
W. J. Yancey
J. H. Yancey

UNITED STATES PATENT OFFICE.

WILLIAM J. YANCEY AND JAMES H. YANCEY, OF BROCKTON, MASSACHUSETTS.

HOSE-COUPLING.

994,230.  Specification of Letters Patent.  Patented June 6, 1911.

Application filed January 4, 1910. Serial No. 536,371.

*To all whom it may concern:*

Be it known that we, WILLIAM J. YANCEY and JAMES H. YANCEY, citizens of the United States, both residing at Brockton, in the county of Plymouth and State of Massachusetts, have invented certain new and useful Improvements in Hose-Couplings, of which the following is a specification.

This invention relates to couplings for hose pipes, and the object of the invention is to provide a novel coupling so constructed as to permit the two members of the coupling to be coupled together by a relative longitudinal movement between them and by the partial turning of a clamp ring without the necessity of screwing one coupling member into the other.

In our improved coupling one of the coupling members is provided with a plurality of gripping jaws disposed in recesses formed in one of the coupling members, the exposed faces of which are so formed as to grip and engage with the screw threads of the complementary coupling member. The gripping jaws are so mounted that they yield outwardly except when clamped and they are moved inward or outward by means of an actuating ring supported on the coupling member, which in one position holds the jaws inward and in the other position holds the jaws outward.

The details of our invention are shown in the accompanying drawings, wherein:

Figure 1 is a longitudinal diametrical section of our improved coupling, the male member of the coupling being shown in elevation; Fig. 2 is a transverse section on the line 2—2 of Fig. 1 and showing the gripping dogs in their inner position; Fig. 3 is a like view, showing the gripping dogs in their outer position, and Fig. 4 is a fragmentary section of the gripping ring and adjacent parts to show the interlocking engagement between the gripping ring and the lock nut and flange.

Corresponding and like parts are referred to in the following description and indicated in all the views of the drawings by the same reference characters.

Referring to these figures, A designates a male coupling member and B a female member, the member A being provided with the usual exteriorly screw threaded portion A'. The female member B comprises an annular body 2 which is formed with an outwardly projecting flange 3 upon its end, this flange being provided at opposite points with the studs 4 whereby the coupling member may be turned. The body portion 2 inward of the flange 3 is formed with a plurality of recesses 5. Mounted exteriorly of the body portion 2 in line with these recesses are a plurality of dogs 6, the inner ends of which are formed with segments of screw threads, as at 7, these screw threads corresponding to the threads of the portion A' of the male member A. Each dog has an extension 8 which is pivoted, as at 9, upon the wall of the body portion 2 and the extremity of the extension 8 beyond the pivot is outwardly turned, as at 10. The outer end of each is rounded so as to have easy engagement with one of a plurality of cam projections 11 formed on the interior of a gripping ring 12. This ring 12 surrounds the exterior of the body and is located between the flange 3 of the body portion 2 and a locking nut or ring 13. The gripping ring 12 has free rotative movement between the flange 3 and the ring 13 so that when the gripping ring is turned in one position, the bosses or cam projections 11 will engage with the dogs 6 and force them inward, while when turned to the other limit of its movement, the projections 11 will engage with the outwardly turned end 10 of the extensions 8 and thus move the dogs outward. In order to limit the movement of the ring 12, we form the body 2 with the outwardly projecting stops 14 which are located to one side of the recesses 5. The projections 11 at both extremities of their movement will contact with the stops 14. We have shown the dogs arranged around the body portion 2 and therefore the ring 12 may be moved one through one-sixth of a complete circle in order to force the dogs inwardly or outwardly. When the dogs are forced inwardly they are engaged with the screw threads on the portion A' of the male member and when forced outwardly by a reverse movement of the ring 12 they will permit the member A' to be inserted or withdrawn.

The gripping ring 12 is held in its proper position by means of the locking nut or ring 13. In order to guide the gripping ring in its movement so that it will always be held in proper position and yet be free to rotate, we form the ring 12 upon each edge with an outwardly projecting rib 15. The rib on one edge of the ring engages in a groove 16 formed on the adjacent side of the flange 3, while the rib 15 on the opposite edge of the ring 12 engages in a groove 17 formed in the locking ring 13. It will thus be seen that by screwing up upon the ring 13 that the ring 12 may be held with any desired degree of friction and may work as loosely or as tightly as demanded.

The operation of our invention is obvious. When it is desired to couple the two pipes to each other, it is only necessary to insert the portion A into place within the female member, then rotate the gripping ring 12 through one-sixth of a circle which will force the dogs 6 inward and into engagement with the threads of the portion A⁷. After the two members of the coupling have been thus locked together, one coupling may be turned upon the other to screw them tightly together. It will be obvious that as the outer ends of the dogs 6 are rounded and the projections 11 are rounded, that the dogs may be forced in to any extent required, so as to grip the screw thread portion A′ with a greater or less degree of force. Thus the male member may be put in position, the dogs forced inward to engage the same, the two coupling members screwed together and then the dogs fully forced in to practically lock the two members in a screw threaded engagement.

Our invention is entirely positive in its action for the reason that no springs are used for forcing the dogs 6 inward, but that the dogs are moved both inward and outward by means of the cam-like projections 11.

Our invention is simple in operation, can be easily dismembered to provide for repair or a cleaning of the parts and though it provides for a quick coupling of the two members, yet has all of the advantages of a screw threaded coupling.

Having thus described the invention, what is claimed as new is:

1. In a hose coupling, a female coupling member having a plurality of circumferentially extending recesses formed in its outer wall, a passage extending from one end of each recess inward to the interior face of the said member, a plurality of inwardly movable dogs disposed one in each of said recesses opposite to said passage, the inner faces of the dogs having screw threads, the outer ends of the dogs having a laterally turned extension pivoted to the wall of the corresponding circumferential recess, the end of said extension beyond the pivotal point thereof being outwardly curved, a gripping ring surrounding the female coupling member and having a plurality of cam projections upon its inner face, one for each of said recesses, each projection extending into a recess and engaging the dog or the extension thereof to positively move the dog inward or outward.

2. In a hose coupling, a female coupling member having an enlarged head formed with an annular flange extending parallel to the axis of the coupling, said flange having a plurality of circumferentially extending recesses formed in its outer wall, a passage extending from one end of each recess inward to the interior face of the said member, a plurality of inwardly movable dogs disposed one in each of said recesses opposite to said passages, the inner faces of the dogs being screw threaded, the outer ends of the dogs each having a laterally turned extension, said extension being inwardly curved and then outwardly curved and being pivoted to the wall of the flange at the junction of the inward and outward curves of the extension, and a gripping ring surrounding said flange opposite to the recesses and having a plurality of cam projections upon its inner face, each projection extending into one of said recesses and being adapted to engage either with the dogs or the terminal ends of the extensions to move the dogs inward or outward, means for removably holding said gripping ring in place on the flange, outwardly projecting studs on the gripping ring, and outwardly projecting studs on the flange.

3. In a hose coupling, a female coupling member comprising a body portion having an outwardly extending annular flange at its end, the inner end face of said flange being grooved, said body portion being also provided with a plurality of recesses, a plurality of gripping dogs mounted in said recesses, a rotatable gripping ring surrounding said dogs and having means for engaging the dogs to hold them inward or outward as the ring is rotated in one direction or the other, and a locking ring having screw threaded engagement with the body of the coupling inward of the dog and formed upon its edge with an annular groove oppositely disposed to the groove on the inner end of the flange, said gripping ring engaging at opposite edges with said grooves for a rotative movement.

4. In a hose coupling, a coupling member comprising a body portion having an outwardly extending annular flange at its end, the inner end face of said flange being grooved, said body portion also being provided with a plurality of radial recesses, a plurality of gripping dogs mounted in said recesses, a rotatable gripping ring surrounding said dogs and having cam projections engaging the dogs to hold them inward or outward, and a locking ring having screw threaded engagement with the body of the coupling inward of the dogs and formed upon its edge with an annular groove, said gripping ring being provided upon opposite edges with annular ribs adapted to engage in the grooves of the flange on the body portion and of said locking ring.

In testimony whereof we affix our signatures in presence of two witnesses.

WILLIAM J. YANCEY. [L. S.]
JAMES H. YANCEY. [L. S.]

Witnesses:
JOHN H. THOMPSON,
FRED M. VINTON.

Copies of this patent may be obtained for five cents each, by addressing the "Commissioner of Patents, Washington, D. C."